United States Patent
Mehner et al.

(10) Patent No.: US 7,819,012 B2
(45) Date of Patent: Oct. 26, 2010

(54) VIBRATION MEASURING SYSTEM

(75) Inventors: Jan Mehner, Neukirchen (DE); Jens Makuth, Feucht (DE); Dirk Scheibner, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 384 days.

(21) Appl. No.: 11/917,812

(22) PCT Filed: Jun. 12, 2006

(86) PCT No.: PCT/EP2006/063101

§ 371 (c)(1),
(2), (4) Date: Dec. 17, 2007

(87) PCT Pub. No.: WO2006/134092

PCT Pub. Date: Dec. 21, 2006

(65) Prior Publication Data

US 2008/0196503 A1 Aug. 21, 2008

(30) Foreign Application Priority Data

Jun. 17, 2005 (DE) .................. 10 2005 028 214

(51) Int. Cl.
*G01P 15/125* (2006.01)
*G01P 15/097* (2006.01)
*G01P 15/14* (2006.01)

(52) U.S. Cl. .................. 73/651; 73/514.24; 73/514.29; 73/514.32

(58) Field of Classification Search .............. 73/514.25, 73/514.29, 514.32, 514.31, 649, 651, 658, 73/660, 661

See application file for complete search history.

(56) References Cited

U.S. PATENT DOCUMENTS

| | | | |
|---|---|---|---|
| 2,979,959 A | 4/1961 | Clurman | |
| 3,435,260 A | 3/1969 | Seidel | |
| 3,512,402 A | 5/1970 | Foster | |
| 3,930,405 A | 1/1976 | Renken, Jr. | |
| 6,032,533 A | 3/2000 | Su | |
| 6,199,874 B1 | 3/2001 | Davis | |
| 6,324,910 B1 | 12/2001 | Funk et al. | |
| 2002/0011107 A1* | 1/2002 | Sakai et al. | 73/514.32 |
| 2003/0056589 A1* | 3/2003 | Geen et al. | 73/504.14 |
| 2008/0000296 A1* | 1/2008 | Johnson | 73/514.18 |

FOREIGN PATENT DOCUMENTS

GB 938385 A 10/1963

\* cited by examiner

*Primary Examiner*—Hezron Williams
*Assistant Examiner*—Rose M Miller
(74) *Attorney, Agent, or Firm*—Henry M. Feiereisen; Ursula B. Day

(57) ABSTRACT

A vibration measuring system for the frequency-selective measuring of especially low-frequency vibrations relevant in the area of automation and motive power engineering is disclosed which allows an economical vibration analysis of frequencies in the range of from 0 to 1 kHz. For this purpose, a broad-band transmitting structure which is directly induced by the excitation signal to be determined is coupled to a receiving structure by an electrostatic or inductive force. This force coupling brings about an amplitude modulation of a carrier signal inducing the receiving structure. The spectrum of the amplitude-modulated carrier signal can then be used to extract the actual excitation signal, e.g. by suitably choosing the frequency of the carrier signal.

15 Claims, 2 Drawing Sheets

VIBRATION MEASURING SYSTEM

The invention relates to a vibration measuring system for the frequency-selective measurement of vibrations.

Such a system is used, for example, in automation and drive technology, and there it can preferably be used to monitor the state of abrasion-afflicted components. Furthermore, the invention can be used to monitor production processes which can be disturbed by vibrating surroundings. Also, the invention can be used to characterize vibrating systems and components.

Production failures due to unexpected defects of machines can produce a significant amount of direct and subsequent damage, dependent on sector and type of process. To increase the reliability of production machines and machine tools, process plants, transport systems and the like and thus to reduce down times of these production means, more and more importance is therefore placed on an early abrasion and defect detection.

For example, in the case of electrical machines, a failure of the production means or one of its components (e.g., the bearings) is often preceded by a change in the vibration response. These changes can be detected by vibration analysis. In this manner, affected components can be changed early, before the whole system fails and thus leads to a lengthy production stop.

Depending on the frequency range of the relevant vibrations, the frequencies can be measured selectively or be determined from a broadband by later Fourier analysis. For technical reasons, the use of frequency-selective sensors allows the analysis of rather higher frequency vibrations (>1 kHz). These days, low frequency vibrations (<1 kHz) are generally acquired by a broadband piezoceramic sensor. The individual frequency components are subsequently determined by means of a fast Fourier transform (FFT), performed by software or hardware, from the measured signal.

The invention is based on the object of enabling an economic vibration analysis.

This object is achieved by a vibration measuring system with a transmitting structure which can vibrate and can be excited by an excitation signal to mechanically vibrate at an excitation frequency and is arranged in such a way with regard to a receiving structure, which can vibrate and be excited by a carrier signal at a carrier frequency, that in an excited state the transmitting structure exerts on the receiving structure a force which modulates the amplitude of the carrier signal and is dependent on the excursion of the transmitting structure.

The vibration measuring system according to the invention uses two structures which can vibrate. The transmitting structure, which can vibrate, is excited directly by the excitation signal, whose amplitude is to be determined by the system. Compared to the receiving structure, the transmitting structure has a relatively low resonant frequency and works as a broadband acceleration sensor. The invention is based on the knowledge, that the excitation signal which is to be determined can be transferred into a higher frequency range by a suitable coupling of the transmitting and receiving structures. In the higher frequency range, a frequency-selective measurement of the amplitude of the excitation signal can be realized economically with simple means. In this case, the transmitting and receiving structures are arranged relative to one another in such a way that there is a multiplicative coupling between these two structures with regard to the frequencies. It is possible in this manner to dispense with a computationally very costly Fourier transformation of the time signal for spectral evaluation.

The mode of operation of the vibration measuring system according to the invention can be explained as follows. The receiving structure is excited by a carrier signal which, in general, is of high frequency. By coupling the transmitting structure with the receiving structure, the carrier signal is amplitude modulated with the excitation signal. This is achieved by the transmitting structure exerting a force on the receiving structure which depends on the excursion of the transmitting structure in relation to its rest position.

By modulating the carrier signal with the excitation signal, the excitation signal can be found again in the frequency spectrum of the receiver as left and right sideband of the carrier signal.

In particular, in the field of automation and drive technology, the relevant frequencies for state monitoring lie in the range of a few Hertz up to 1 kHz. It is therefore advantageous to provide the vibration measuring system for the frequency-selective determination of mechanical vibrations whose frequencies are preferably lower than 1 kHz. Conventional frequency-selective measuring systems cannot acquire such frequencies, or can do so only with great effort.

By means of an advantageous embodiment of the vibration measuring system in which the carrier frequency is greater than the excitation frequency, the excitation signal actually to be determined can be transferred into a higher frequency range, in which frequency-selective acquisition is possible with little effort.

Expediently, the vibration measuring system has an apparatus for adjusting the carrier frequency. In this manner, the spectral range which is available for evaluation can be chosen freely. The frequency of the carrier is expediently chosen in such a way, that the left or right sideband lies at a resonance point of the receiver.

Due to the amplitude modulation, the excitation signal to be evaluated is available in the frequency spectrum as left and right sideband of the amplitude-modulated carrier signal. A simple evaluation of this frequency spectrum or an economic extraction of the excitation signal may be realized by virtue of the fact that the receiving structure has a resonant frequency which essentially corresponds to a sideband of the amplitude-modulated carrier signal. By such a choice of the resonant frequency, the corresponding sideband and therefore the transferred excitation signal are filtered with frequency selection. In this manner, the frequency of the carrier is expediently chosen such that the left or right sideband lies at the resonance point of the receiver.

To be able to determine different excitation frequencies with the vibration system, it is advantageous that the resonant frequency of the receiving structure can be adjusted. Therefore, the overlap of a sideband of the carrier signal can alternatively be achieved by adjusting the resonant frequency of the receiver or adjusting the carrier frequency.

The coupling between the receiving structure and the transmitting structure can be realized in a number of different ways. A first embodiment is formed in such a manner, that the receiving structure is capacitively coupled to the transmitting structure, and an AC voltage at the carrier frequency can be applied between the receiving structure and the transmitting structure. In this manner, the force coupling required for the amplitude modulation is achieved by electrostatics.

Here, an electrode arrangement is particularly desirable, in which the coupling of the vibrating structures produces a linearly changing force, that is to say the force which the transmitting structure exerts on the receiving structure should depend linearly on the excursion of the transmitting structure. To realize this, the receiving and transmitting structures are to be configured in such a way that together they create a capacitance which has a quadratic dependence on the excursion of the transmitting structure. Such a capacitance excursion characteristic can, for example, be created by virtue of the fact that the receiving and transmitting structures each have a comb-like structure, the comb-like structures being at least partly arranged in an interlocking fashion. Furthermore, in such an embodiment it is expedient to provide an evaluation comb which is arranged in a fashion engaging at least partly in the comb-like structure of the receiving structure. With the aid of the evaluation channel, the measured signal and the transferred excitation signal can easily be taken from the receiving structure.

A second embodiment of the vibration measuring system according to the invention is characterized in that the receiving structure is inductively coupled to the transmitting structure and an alternating current at the carrier frequency can be impressed on the receiving structure and/or the transmitting structure. Furthermore, the transmitting structure can also comprise a permanent magnet which exerts a force on the current-carrying receiving structure. It is also possible that the receiving structure has a permanent magnet which exerts a force on the current-carrying transmitting structure.

To improve the signal-to-noise ratio independently of the type of force coupling between the transmitting structure and receiving structure, it is expedient, that the vibration measuring system has an amplifier to amplify a part of the spectrum of the amplitude-modulated carrier signal, in which the part essentially vibrates with the resonant frequency of the receiving structure.

For evaluation purposes, it is advantageous if the vibration measuring system has an evaluation device for filtering and/or demodulating the amplitude-modulated carrier signal.

Due to the vibration measuring system being able to be realized economically compared to present-day vibration measuring systems, the vibration measuring system can be provided, in particular, for permanently monitoring the state of production means. Since the vibration measuring system works in a frequency-selective manner, it can do without the considerable hardware and software complexity required to realize an FFT, which is required by broadband sensors.

An alternative application of the vibration measuring frequency system is characterized in that the vibration measuring system is provided for the monitoring of a vibration-sensitive production process. Here, a permanent monitoring of vibrations which could endanger the correct sequencing of the process can also be conducted with aid of the system.

In the following the invention will be described and explained in more detail with reference to the exemplary embodiments illustrated in the figures, in which.

Figure 1:
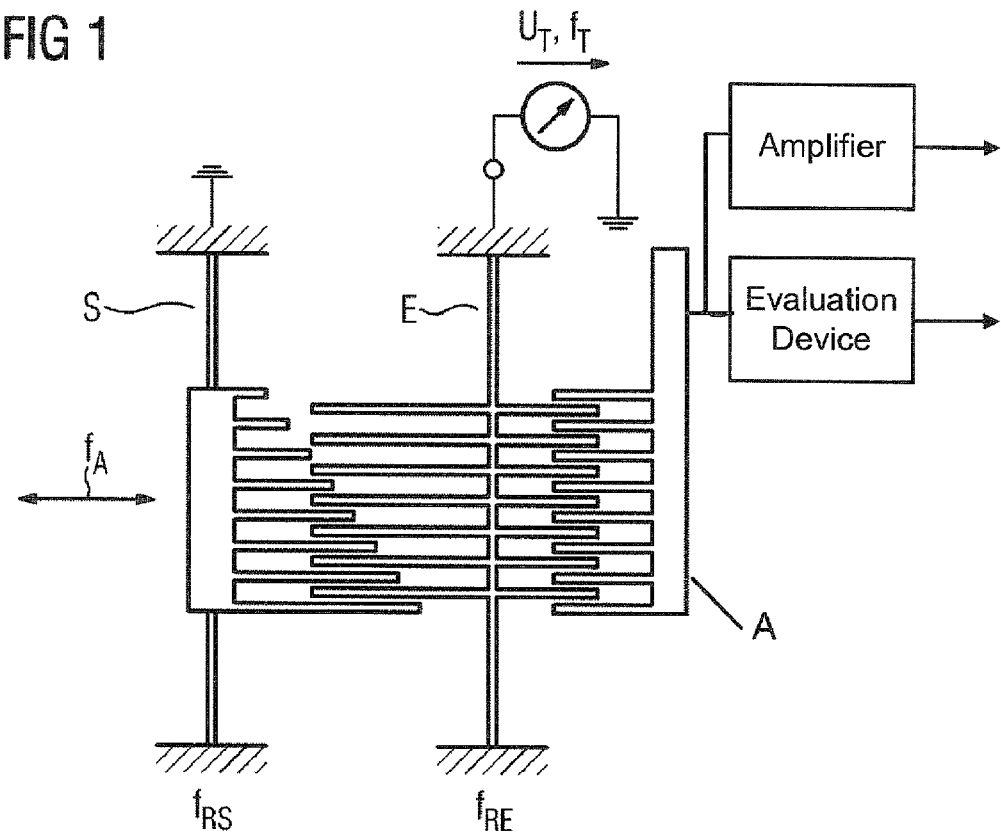
FIG. 1 shows a vibration measuring system with capacitive coupling.

FIG. 1 shows a vibration measuring system with capacitive coupling. The vibration measuring system comprises three comb-like structures S, E, A which are coupled to one another by electrostatic forces. It is assumed that the illustrated system is provided for the determination of vibrations on electric driver, in which the relevant vibrations are in the range from a few Hertz up to 1 kHz.

The vibration measuring system comprises a broadband transmitting structure S with a resonant frequency $f_{RS}$ of 3 kHz. The linear measuring range of the transmitting structure S thus reaches up to approximately 1 kHz. This transmitting structure S is directly excited by a mechanical excitation signal, which originates from the electric drive and vibrates at the frequency $f_A$. The comb-like structure of the transmitting structure S partly engaged in a receiving structure E which is also configured in a comb-like manner and whose resonant frequency is, for example, one decade higher than the excitation frequency $f_A$, that is to say around 10 kHz.

An AC voltage with an amplitude $U_T$ and frequency $f_T$ is applied between the receiving structure E and the transmitting structure S. This AC voltage supplies the carrier signal, which is modulated by the excitation signal at the excitation frequency $f_A$.

Thus, the transmitting structure S and the receiving structure E together form a capacitor to which the voltage $U_T$ is applied. Due to the illustrated comb-like embodiment of these two structures, the capacitance C of this capacitor has a quadratic dependence on the excursion of the transmitting structure S. It therefore holds that:

$$C \sim x^2$$

A differentiation of this relationship yields:

$$\frac{dC}{dx} \sim 2x$$

The change of the energy W stored in the capacitor depending on the excursion can be evaluated using an energy balance equation:

$$dW = \frac{1}{2} U_T^2 dC = F dx$$

Finally, a relationship between the electrostatic force F and the excursion x is given by, $$F = \frac{U_T^2}{2} \frac{dC}{dx} \sim U_T^2 \cdot x$$

The quadratic dependence of the capacitance profile therefore results in a multiplicative coupling between the carrier signal and the excursion x of the transmitting structure.

The amplitude-modulated carrier signal is read out with aid of an evaluation comb A and can finally be amplified electronically there to improve the signal to noise ratio.

Figure 2:
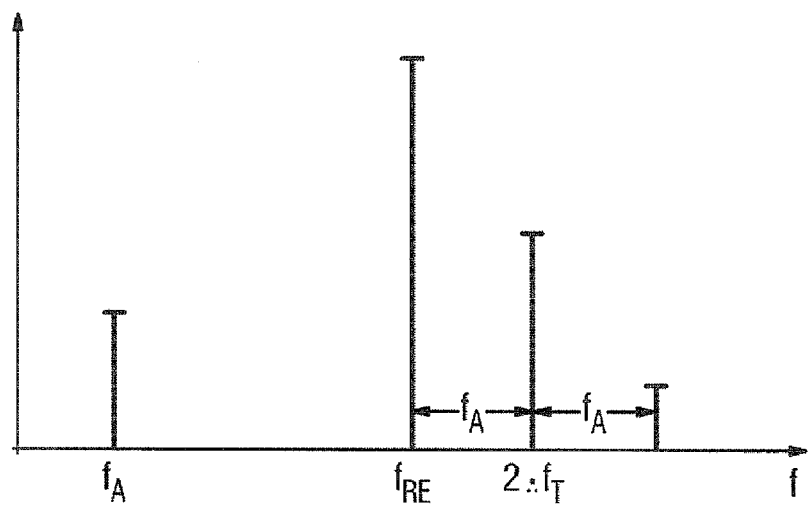
FIG. 2 shows a frequency spectrum of the vibration measuring system with capacitive coupling.

FIG. 2 shows a frequency spectrum of the vibration measuring system with capacitive coupling. The vibration amplitudes are illustrated against the corresponding frequency components F. Due to the comb-like structure illustrated in FIG. 1, the carrier frequency is initially doubled. For example, if a voltage with the carrier frequency $f_T$ is applied to the receiving structure E, this signal is transferred to a frequency $2 f_T$ by the squaring of the voltage under the influence of an electrostatic force. The excitation frequency $f_A$ of the actually relevant excitation signal is mapped in the amplitude spectrum onto the left and right sideband of the spectrum expressed by double the carrier frequency. If, for example, a voltage with the carrier frequency $f_T$ of 5.1 kHz was applied to the receiving structure E, and the frequency $f_A$ of the excitation signal is 200 Hz, then a frequency spectrum of the receiver is formed about 10.2 kHz with a left sideband at 10 kHz and a right sideband at 10.4 kHz. In order to determine the amplitude of the excitation signal vibrating at 200 Hz, the resonant frequency $f_{RE}$ of the receiving structure E is now set to 10 kHz. Thus, the resonant frequency $f_{RE}$ of the receiving structure E corresponds to the left sideband of the illustrated frequency spectrum. Due to this, there is resonance step-up, whereby the left sideband is increasingly available for evaluation. The actual evaluation of the signal is carried out by subsequent filtering of demodulation of this sideband.

Figure 3:
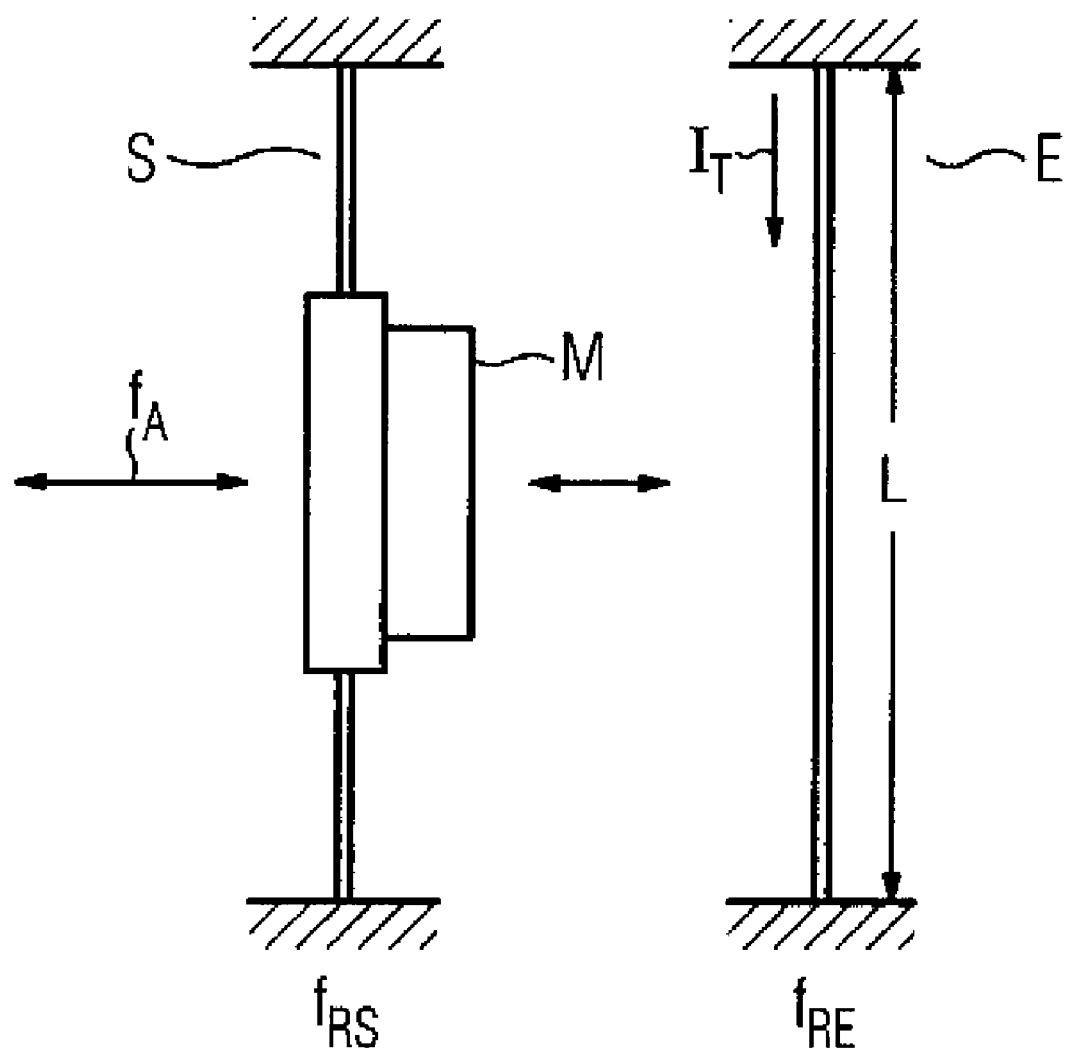
FIG. 3 shows a vibration measuring system with inductive coupling.

FIG. 3 shows a vibration measuring system with inductive coupling. In the illustrated case, a transmitting structure S, which is excited directly by the excitation signal at a frequency $f_A$, is configured with a permanent magnet M. The transmitting structure S in turn acts as a broadband acceleration sensor and has a relatively low resonant frequency $f_{RS}$. A receiving structure E of the vibration measuring system is configured as an electrical conductor of length L and with a resonant frequency $f_{RE}$, which is at least one decade higher. An alternating current $I_T$, with a carrier frequency $f_T$, is impressed in this electrical conductor of the receiving structure E. An electromagnetic coupling force of magnitude $F=I \cdot L \cdot B$ is created between the transmitting structure S and the receiving structure E by the magnetic field of the permanent magnet M and the magnetic field produced by the carrier current $I_T$ inside the receiving structure E. In this case, B denotes the magnetic field strength.

As an alternative to the illustrated embodiment, it is of course also possible, and included in the invention, to configure the receiving structure to include the permanent magnet M, and to impress the carrier current $I_T$ on the transmitting structure.

The mode of operation of the illustrated vibration measuring system with inductive coupling is similar to the structure with capacitive coupling illustrated in FIG. 1. However, in comparison to the electrostatic coupling, no frequency doubling of the carrier occurs, because in the case of the force coupling there is no squaring of the carrier frequency, but only simple multiplication.

To summarize, the invention relates to a vibration measuring system for the frequency-selective vibration measurement, in particular low frequencies which are relevant in the field of automation and drive technology. In order to be able to realize an economic vibration analysis of frequencies in the range from 0 to 1 kHz, it is proposed to couple a broadband transmitting structure, which is directly excited by the excitation signal to be determined, to a receiving structure via a multiplicatively acting mechanism, such as electrostatic or inductive forces. This force coupling leads to an amplitude modulation of a carrier signal which excites the receiving structure. The actual excitation signal can be extracted from the spectrum of the amplitude-modulated carrier signal, for example by means of a suitable choice of the resonant frequency of the receiving structure and the frequency of the carrier signal.

What is claimed is:

1. A vibration measuring system for measuring mechanical vibrations, comprising:
    a transmitting assembly capable of being excited by a excitation signal to mechanically oscillate at an excitation frequency
    a receiving assembly capable of being excited by a carrier signal to oscillate at a carrier frequency and having a resonance frequency,
    wherein the transmitting assembly, when excited, applies to the receiving assembly a force which depends on an excursion of the transmitting assembly and modulates the amplitude of the carrier signal depending on the excursion of the transmitting structure,
    wherein at least one of the carrier frequency and the resonant frequency of the receiving structure is adjusted so that the resonant frequency essentially corresponds to a sideband of the amplitude-modulated carrier signal, and
    wherein the receiving assembly is capacitively coupled to the transmitting assembly, and an AC voltage having the carrier frequency is applied between the receiving assembly and the transmitting assembly.

2. The vibration measuring system of claim 1, wherein the mechanical vibrations have frequencies less than 1 kHz.

3. The vibration measuring system of claim 1, wherein the carrier frequency is greater than the excitation frequency.

4. The vibration measuring system of claim 1, further comprising an apparatus for adjusting the carrier frequency.

5. The vibration measuring system of claim 1, wherein a combined capacitance of the receiving and transmitting assemblies has a quadratic dependence on the excursion of the transmitting assembly.

6. The vibration measuring system of claim 1, wherein the receiving and transmitting assemblies each have a comb shaped structure arranged at least partly in an interlocking fashion.

7. A vibration measuring system for measuring mechanical vibrations, comprising:
    a transmitting assembly capable of being excited by a excitation signal to mechanically oscillate at an excitation frequency
    a receiving assembly capable of being excited by a carrier signal to oscillate at a carrier frequency and having a resonance frequency,
    wherein the transmitting assembly, when excited, applies to the receiving assembly a force which depends on an excursion of the transmitting assembly and modulates the amplitude of the carrier signal depending on the excursion of the transmitting structure, and
    wherein at least one of the carrier frequency and the resonant frequency of the receiving structure is adjusted so that the resonant frequency essentially corresponds to a sideband of the amplitude-modulated carrier signal, wherein the receiving and transmitting assemblies each have a comb shaped structure arranged at least partly in an interlocking fashion,
    the vibration measuring system further comprising an evaluation comb which at least partly engages with the comb shaped structure of the receiving assembly.

8. The vibration measuring system of claim 7, wherein the receiving assembly is inductively coupled to the transmitting assembly, and an AC current having the carrier frequency is applied to the transmitting assembly.

9. The vibration measuring system of claim 1, further comprising an amplifier for amplifying a frequency component of the amplitude-modulated carrier signal having a frequency close to the resonant frequency of the receiving assembly.

10. The vibration measuring system of claim 1, further comprising an evaluation device for filtering or demodulating, or both, of the amplitude-modulated carrier signal.

11. The vibration measuring system of claim 7, further comprising an amplifier for amplifying a frequency component of the amplitude-modulated carrier signal having a frequency close to the resonant frequency of the receiving assembly.

12. The vibration measuring system of claim 7, further comprising an evaluation device for filtering or demodulating, or both, of the amplitude-modulated carrier signal.

13. The vibration measuring system of claim 7, wherein the mechanical vibrations have frequencies less than 1 kHz.

14. The vibration measuring system of claim 7, wherein the carrier frequency is greater than the excitation frequency.

15. The vibration measuring system of claim 7, further comprising an apparatus for adjusting the carrier frequency.

* * * * *